United States Patent
Iinuma

(10) Patent No.: US 6,754,512 B1
(45) Date of Patent: Jun. 22, 2004

(54) WIRELESS BASE STATION USING ADAPTIVE ARRAY FOR SPATIAL MULTIPLEXING

(75) Inventor: Toshinori Iinuma, Gifu (JP)

(73) Assignee: Sanyo Electric Co., Ltd., Osaka (JP)

(*) Notice: Subject to any disclaimer, the term of this patent is extended or adjusted under 35 U.S.C. 154(b) by 412 days.

(21) Appl. No.: 09/714,272

(22) Filed: Nov. 17, 2000

(30) Foreign Application Priority Data

Nov. 19, 1999 (JP) .......................................... 11-330736

(51) Int. Cl.[7] .............................................. H04M 1/00
(52) U.S. Cl. ............................... 455/562.1; 455/456.5; 455/276.1; 342/368
(58) Field of Search ................................. 455/562, 422, 455/450, 456, 25, 501, 522, 66, 101, 103, 273, 276.1, 277.1, 277.2, 278.1, 453, 561, 562.1, 456.5; 342/107, 109, 113, 146, 359, 360, 367, 368, 371

(56) References Cited

U.S. PATENT DOCUMENTS

| | | | | |
|---|---|---|---|---|
| 5,260,968 A | * | 11/1993 | Gardner et al. | 375/347 |
| 5,515,378 A | * | 5/1996 | Roy, III et al. | 370/334 |
| 5,603,089 A | * | 2/1997 | Searle et al. | 455/507 |
| 5,708,441 A | * | 1/1998 | Kanai | 342/359 |
| 5,778,324 A | * | 7/1998 | Smith | 455/562.1 |
| 5,818,386 A | * | 10/1998 | Belisle | 342/372 |
| 5,873,048 A | * | 2/1999 | Yun | 455/446 |
| 5,893,033 A | * | 4/1999 | Keskitalo et al. | 455/437 |
| 5,924,040 A | * | 7/1999 | Trompower | 455/456.2 |
| 5,936,569 A | * | 8/1999 | St.ang.hle et al. | 342/174 |
| 6,188,913 B1 | * | 2/2001 | Fukagawa et al. | 455/562.1 |
| 6,351,499 B1 | * | 2/2002 | Paulraj et al. | 375/267 |

* cited by examiner

Primary Examiner—Charles Craver
(74) Attorney, Agent, or Firm—Arent Fox, PLLC

(57) ABSTRACT

A wireless base station includes a determining unit, a first calculation unit and a control unit. The determining unit determines a direction in which a specified mobile station that is to be spatially-multiplexed is located. Then, the first calculating unit calculates a first parameter group, used to form a first directional pattern for each already connected mobile station that should be spatially-multiplexed with the specified mobile station. The first directional pattern is such that a null point is formed in the determined direction. After a link channel allocation has been transmitted to the specified mobile station, the control unit performs control, so that transmission is performed to each already connected mobile station by forming the corresponding first directional pattern and further by reducing transmission power uniformly in all directions.

5 Claims, 4 Drawing Sheets

WIRELESS BASE STATION USING ADAPTIVE ARRAY FOR SPATIAL MULTIPLEXING

BACKGROUND OF THE INVENTION

1. Field of the Invention

The present invention relates to a wireless base station that uses an adaptive array method to form wireless connections with a plurality of mobile stations using spatial multiplexing.

2. Description of the Related Art

In recent years, an increase in the number of mobile stations such as PHS (Personal Handyphone System) handsets and mobile phones has heightened social requirements for more effective use of communication frequencies. One response to this demand is to perform communication using a spatial multiplexing method.

Such a method involves using highly directive antennas for transmission and reception in a wireless base station, to multiplex a plurality of mobile stations located in different directions on a single frequency channel.

One example of the highly directive antennas that may be used in such a spatial multiplexing method is an adaptive array apparatus. An adaptive array apparatus includes a plurality of positionally fixed antennas. By dynamically adjusting the amplitude and the phase of transmission and reception signals for each antenna, the adaptive array apparatus uses the antennas collectively to form a directional pattern (also known as an array antenna pattern) dynamically each time transmission or reception is performed.

The direction pattern formed by the array antenna apparatus enhances receptivity and transmissivity in the direction of a desired mobile station (also referred to as beam directing or beam steering) as well as reducing receptivity and transmissivity in the direction of other multiplexed mobile stations (also referred to as null directing or nulling out).

The adaptive array apparatus can be easily installed since it is composed of a number of individual fixed antennas, and due to its ability to form a dynamic directional pattern, is particularly suited for use in wireless base stations that need to track the movement of mobile stations. Consequently, adaptive array apparatuses make effective use of frequency resources and are being widely used commercially.

Further details regarding an adaptive array apparatus are contained in Kukan Ryoiki Ni Okeru Tekioshingo Shori To Sono Oyogijyutsu Ronbuntokushu (Adaptive Signal Processing and Applied Techniques in the Spatial Domain: Special Edition) in Denshi Tsushin Gakkai Ronbunshi (The Transactions of the Institute of Electronics, Information, and Communication Engineers (IEICE)) Vol. J75-B-II No. 11, November), so a detailed explanation is omitted here.

When an adaptive array apparatus is used in a wireless base station, it changes the directional pattern to track the movement of each multiplexed mobile station, thereby avoiding interference and maintaining communication performance levels. This operation is conventionally performed as follows.

If a signal from a mobile station to be tracked is received, the adaptive array apparatus controls the amplitude and phase of reception signals for each antenna so as to reduce an error between the reception signal and a predetermined part of the original signal (hereafter referred to as a 'reference signal'). The reference signal may correspond, for example, to a UW (unique word) field, if the signal is compliant with the PHS standard. By performing such a control, the adaptive array apparatus directs the beam in the direction of the mobile station to be tracked, and nulls out other multiplexed mobile stations.

A base station using a conventional adaptive array apparatus can avoid interference and maintain communication performance by means of this kind of control.

However, using such a conventional control may result in the following problem. When a further mobile station (hereafter the specified mobile station) is to be spatially-multiplexed, the noise level of the channel to which the specified mobile station has been allocated is measured. Here, if another mobile station is already wireless-connected on the same frequency as the specified mobile station, the noise level will not be kept below a reference-value, and in such a case the channel is frequently judged as having excess noise.

As a result, having made a connection using such a method, the specified mobile station will be able to communicate with the base station without inference from signals emitted by the wireless base station to other mobile stations by having the wireless base station form appropriate directional patterns to null out the specific mobile station, but it will not have the opportunity to make a connection on channels on which the other mobile stations are already communicating.

This problem is likely to occur with more frequency when the wireless base station and the specified mobile station are close together, and the noise level of the directional pattern for other already multiplexed mobile stations cannot be sufficiently reduced.

SUMMARY OF THE INVENTION

In order to resolve the above problems, the present invention has as its object the provision of a wireless base station that reduces the influence of carrier waves for already multiplexed mobile stations when the noise level of a channel to be allocated to a specified mobile station is measured, thereby improving the chances of obtaining a connection.

In order to achieve this object, a wireless base station of the present invention uses an adaptive array method to form wireless connections with a plurality of mobile stations using spatial multiplexing. The wireless base station includes a determining unit, a first calculating unit, and a control unit. The determining unit determines a direction in which a specified mobile station that is to be spatially-multiplexed is located. The first calculating unit calculates a first parameter group, used to form a first directional pattern for each already connected mobile station that should be spatially-multiplexed with the specified mobile station. The first directional pattern is such that a null point is formed in the determined direction. The controlling unit performs control, after a link channel allocation has been transmitted to the specified mobile station, so that transmission is performed to each already connected mobile station by forming the corresponding first directional pattern and using reduced transmission power.

This structure reduces the influence of carrier waves for already multiplexed mobile stations, when the noise level of a channel to be allocated to a specified mobile station is measured.

The wireless base station may further include a second calculating unit that calculates a second parameter group used to form a second directional pattern that optimizes signals to and from each already connected mobile station.

Here, the control unit performs control to perform transmission for each already connected mobile station by forming the corresponding second directional pattern and returning transmission power to a normal level. The control is performed when a sync burst signal is received from the specified mobile station, or a specified time expires without a sync burst signal being received from the specified mobile station.

This structure enables the wireless base station, once the noise of the specified mobile station is measured, to return the transmission power of signals output to already connected mobile stations back to a normal level, while maintaining the communication performance of these mobile stations.

The wireless base station may further include a detecting unit that detects a signal level of each already connected mobile station. Here, the control unit reduces the transmission power to each already connected mobile station, based on a corresponding detected signal level.

By using this structure, the wireless base station can restrict transmission power to a low level, if transmitting to a distant mobile station that has already been spatially-multiplexed. This reduces the risk of communications breaking down.

The wireless base station may further include a detecting unit for detecting a signal level of each already connected mobile station. Here, the control means reduces the transmission power to each already connected mobile station, based on a corresponding detected signal level.

This structure enables the same effect to be achieved as for the structure above.

A control method of the present invention may be used by a wireless base station that uses an adaptive array method to form wireless connections with a plurality of mobile stations using spatial multiplexing. The control method comprises the following steps. A determining step determines a direction in which a specified mobile station that is to be spatially-multiplexed is located. A first calculating step calculates a first parameter group, used to form a first directional pattern for each already connected mobile station that should be spatially-multiplexed with the specified mobile station, the first directional pattern being such that a null point is formed in the determined direction. A controlling step performs control, after a link channel allocation has been transmitted to the specified mobile station, so that transmission is performed to each already connected mobile station by forming the corresponding first directional pattern and using reduced transmission power.

A wireless base station controlled by this control method enables the same effect to be obtained as for above.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

A wireless base station in the present embodiment is installed as a PHS base station that forms a wireless connection with one or more PHS mobile stations by performing time division multiple access/time division duplexing (TDMA/TDD) according to the PHS standard. In addition to TDMA, the wireless base station performs spatial multiplexing to communicate with the mobile stations.

Overall Structure

Figure 1:
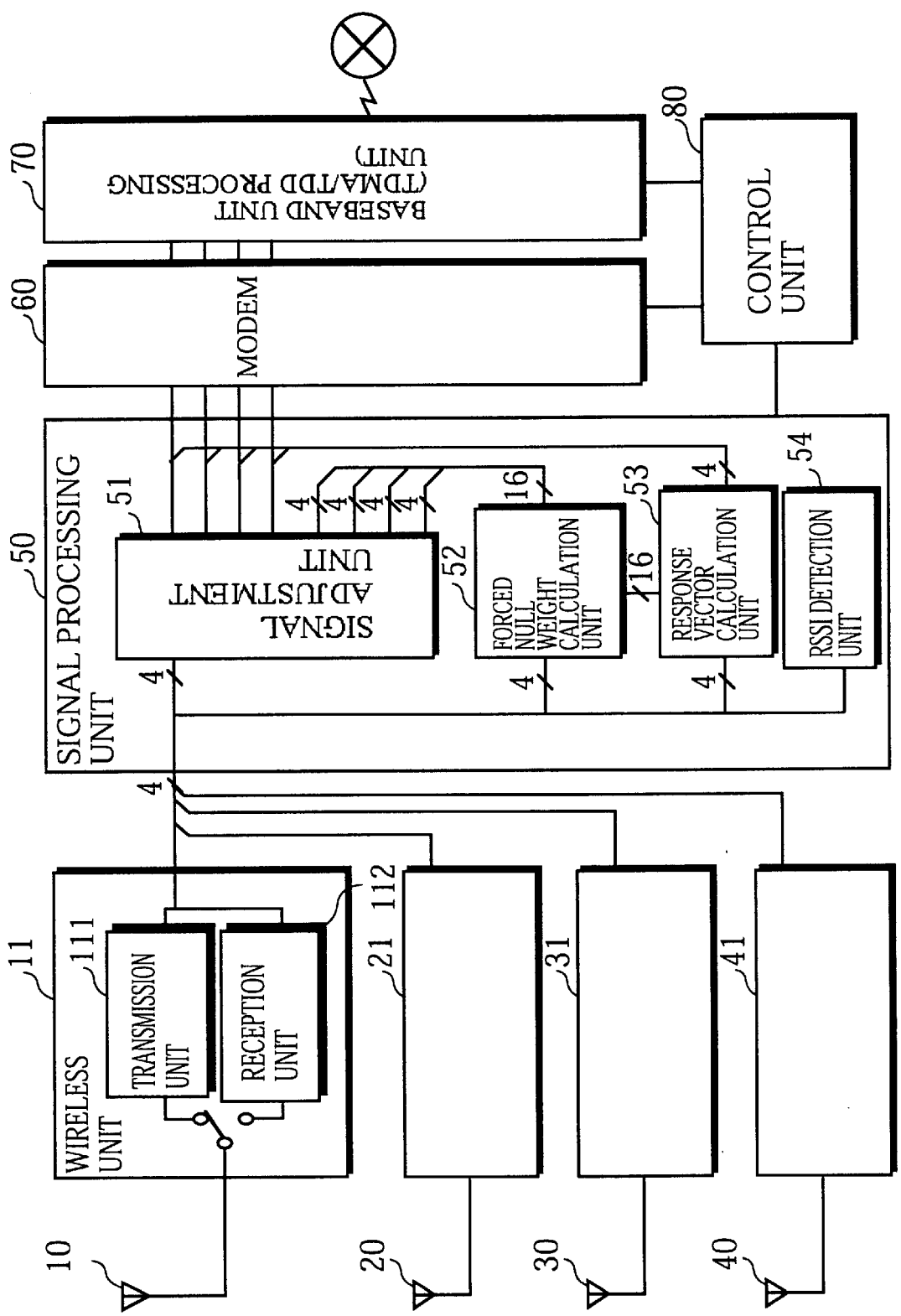
FIG. 1 is a block diagram of a wireless base station in an embodiment of the invention.

FIG. 1 is a block diagram showing a structure for a wireless base station in an embodiment of the invention. The wireless base station includes antennas. 10, 20, 30 and 40, wireless units 11, 21, 311, and 41, a signal processing unit 50, a modem 60, a baseband unit 70, and a control unit 80. The wireless base station spatially-multiplexes a maximum of four signals on a single frequency to perform simultaneous communications.

The baseband unit 70 transfers a plurality of signals (baseband signals containing speech and data) between a plurality of telephone lines connected via a telephone exchange net (not shown), and the signal processing unit 50. In this embodiment, the baseband unit 70 multiplexes four channels into one TDMA/TDD frame in compliance with the PHS standard, and performs parallel processing on signals to be spatially-multiplexed from a maximum of four telephone lines on each channel. Here, a TDMA/TDD frame has a period of 5 ms, and a period is divided into eight equal parts, forming four transmission timeslots and four reception timeslots. Each pair of transmission and reception timeslots form one TDMA channel.

The modem 60 is located between the signal processing unit 50 and the baseband unit 70, and modulates and demodulates digitized baseband signals using $\pi/4$ shift QPSK (quadrature phase shift keying). Modulation and demodulation are performed in parallel on a maximum of four TDMA/TDD frames that have been spatially-multiplexed on one TDMA channel.

The signal processing unit 50 includes a signal adjusting unit 51, a forced null weight calculation unit 52, a response vector calculation unit 53, and a RSSI (received signal strength indicator) detection unit 54, and may be realized by a programmable DSP (digital signal processor).

The signal processing unit 50 adjusts the amplitudes and phases of transmission/reception signals for the wireless units 11, 21, 31, and 41, so as to form a directional pattern for each mobile station. As a result, the signal processing unit 50 can separate signals belonging to each mobile station from-spatially-multiplexed signals input from the wireless units 11, 21, 31, and 41, and output the separated signals to the modem 60. Furthermore, the signal processing unit 50 performs spatial multiplexing so as to transmit a signal input from the modem 60 to a desired mobile station only, and then output the spatially-multiplexed signals to the wireless units 11, 21, 31, and 41.

A directional pattern may be formed using one of two methods. One method is a normal control for reducing an error between an actual received signal and a reference signal. The other method is a control known as the forced null control for directing a beam toward a desired mobile station, and nulling out (directing a null toward) other mobile stations, based on directional information calculated from reception signals. These controls use different methods to optimize communications with a particular mobile station. The signal processing unit 50 determines which method to use according to instructions from the control unit 80.

The response vector calculation unit 53 calculates parameters known as response vectors, including directional information for mobile stations that are communicating in each timeslot, and outputs the calculated parameters to the forced null weight calculation unit 52. Calculation is performed based on signals input from the wireless units 11, 21, 31, and 41, and signals adjusted by the signal adjusting unit 51. This processing is performed in each timeslot within every TDMA/TDD frame.

The forced null weight calculation unit 52 calculates parameters for forming directional patterns so as to direct a beam toward a mobile station that is currently communicating, and to null out other mobile stations (hereafter these parameters are referred to as forced null weight vectors). This calculation is performed based on the parameters calculated by the response vector calculation unit 53. The forced null weight calculation unit 52 then outputs the calculated parameters to the signal adjusting unit 51. This processing is performed in each timeslot of every TDMA/TDD frame. Each forced null weight vector is an amount of adjustment made to the amplitude and phase of transmission and reception signals of each of the wireless units 11, 21, 31, and 41.

The signal adjusting unit 51 adjusts the amplitude and phase of transmission/reception signals for each of the wireless units 11, 21, 31, and 41 so as to optimize transmission and reception of signals to and from each of the mobile stations communicating in each timeslot. This processing is performed for each timeslot in the maximum of four TDMA/TDD frames that can be processed in parallel by the modem 60.

When the normal control method is used, the signal adjustment unit 51 calculates sets of directional pattern parameters (one set for each mobile station) so as to reduce an error between a signal that is actually received from each mobile station, and a reference signal. A set of calculated parameters is hereafter known as a weight vector. Each parameter in a weight vector is an adjustment amount for the amplitude and phase of transmission/reception signals for one of the wireless units. When the forced null control method is used, the forced null weight calculation unit 52 performs adjustment according to the calculated forced null weight vectors. Switching between adjustment methods is performed according to instructions from the control unit 80.

The RSSI detection unit 54 detects signal strengths for signals received by the wireless units 11, 21, 31, and 41, and outputs the detected signal strengths to the control unit 80. This processing is performed in each timeslot of each TDMA/TDD frame.

The wireless unit 11 includes a transmission unit 111, and a reception unit 112, the former including a high-power amplifier or similar, and the latter a low-noise amplifier or similar. The transmission unit 111 converts low frequency signals input from the signal processing unit 50 into high frequency signals, amplifies these signals until a transmission power level is reached, and outputs amplified signals to the antenna 10. The transmission unit 111 has the ability to adjust transmission power by controlling the gain of the high-power amplifier. The reception unit 112 converts high frequency signals received from the antenna 10 to low frequency signals, amplifies the converted signals, and outputs them to the signal processing unit 50.

One wireless unit is provided for each antenna. The other wireless units 21, 31, and 41 have the same structure as the wireless unit 11 and so explanation of these units is omitted.

The control unit 80 includes a CPU (central processing unit) and memory. The CPU controls the entire wireless unit according to a program stored in the memory.

When a mobile station that is to be newly multiplexed (hereafter a specified mobile station) is allocated a channel, the control unit 80 performs forced null control for other mobile stations that should be spatially-multiplexed with the specified mobile station and are already communicating, as well as instructing the wireless units 11, 21, 31, and 41 to reduce the transmission power of to the other mobile stations according to corresponding signal strengths detected by the RSSI detection unit 54. The control unit 80 reduces transmission power if, for example, the signal strength is less than a reference value.

Having received a link channel allocation, a mobile station measures the noise level of the allocated channel, and if the noise level is at least as high-as the reference value, determines that the channel is unusable. However, performing forced nulling and transmission power-reduction on other spatially-multiplexed mobile stations helps to reduce the noise level of the allocated channel.

When a sync burst signal is received from a specified mobile station, or when a certain time period expires without a sync burst signal being received (also known as 'timeout') the control unit 80 performs normal control on the other mobile stations, as well as instructing the wireless units 11, 21, 31, and 41 to return transmission power to a normal level.

If the control for reducing transmission output is performed for a long period of time, there is a danger that the quality of communications with other multiplexed mobile stations will be worsened. The present invention, however, performs enables normal control to be performed following the reception of the sync burst signal, as well as returning transmission power to normal levels, thereby enabling the quality of communications with other mobile stations to be sustained.

Signal Processing Unit

Figure 2:
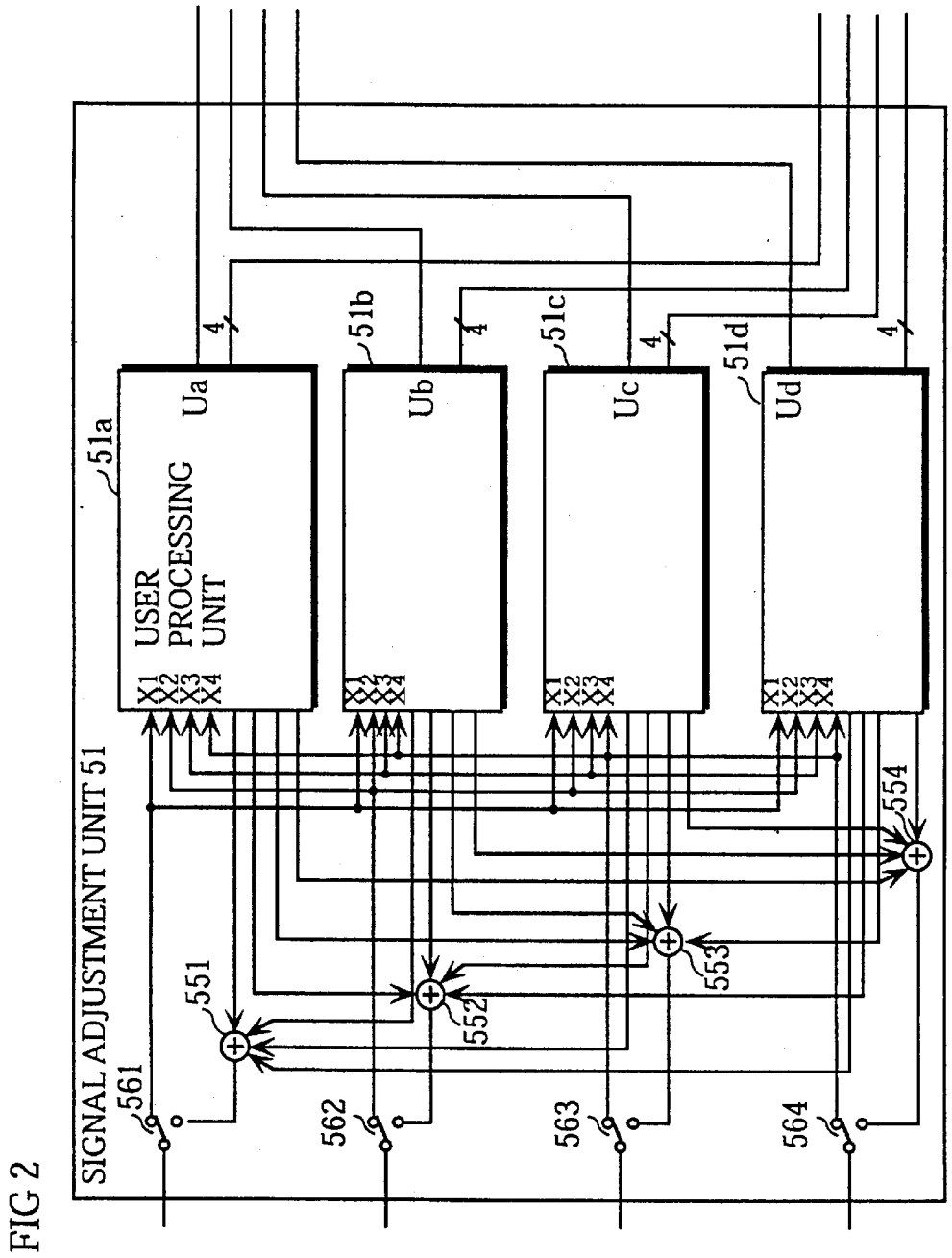
FIG. 2 is a block diagram of a signal processing unit.

FIG. 2 is a block diagram showing a structure of the signal processing unit 51. The signal processing unit 51 includes transmission/reception switches 561 to 564, adders 551 to 554, and user processing units 51*a* to 51*d*.

The user processing units 51*a* to 51*d* adjust the amplitude and phase of signals input and output to and from the wireless units 11, 21, 31, and 41 so as to optimize transmission and reception of signals to and from mobile stations communicating in a particular timeslot. This processing is performed in each timeslot of each TDMA/TDD frame.

The adders 551 and 554 add transmission signals that have been adjusted by the user processing units 51*a* to 51*d*, and output the added signals to the wireless units 11, 21, 31, and 41.

User Processing Unit

Figure 3:
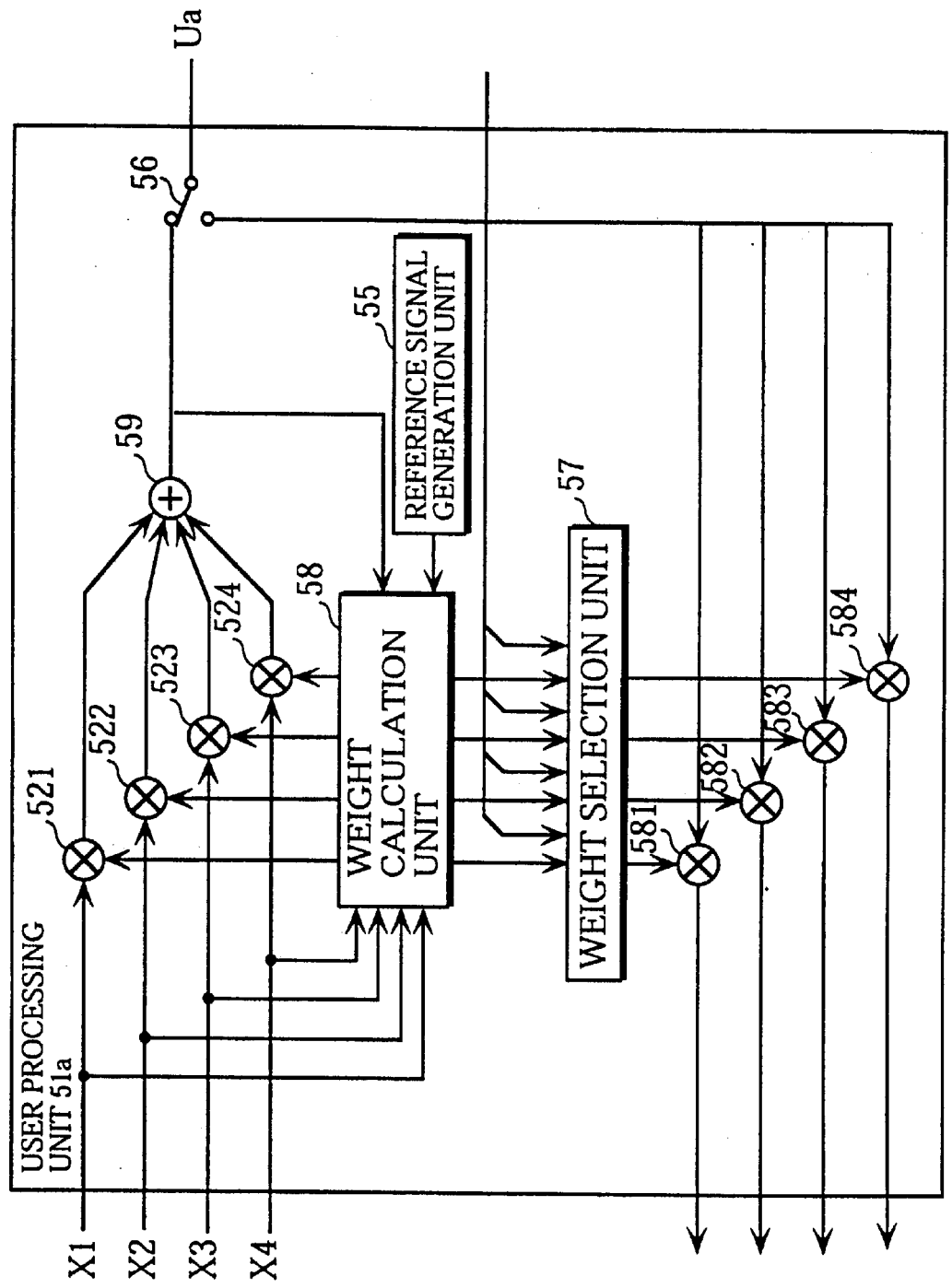
FIG. 3 is a block diagram of a user processing unit.
Figure 4:
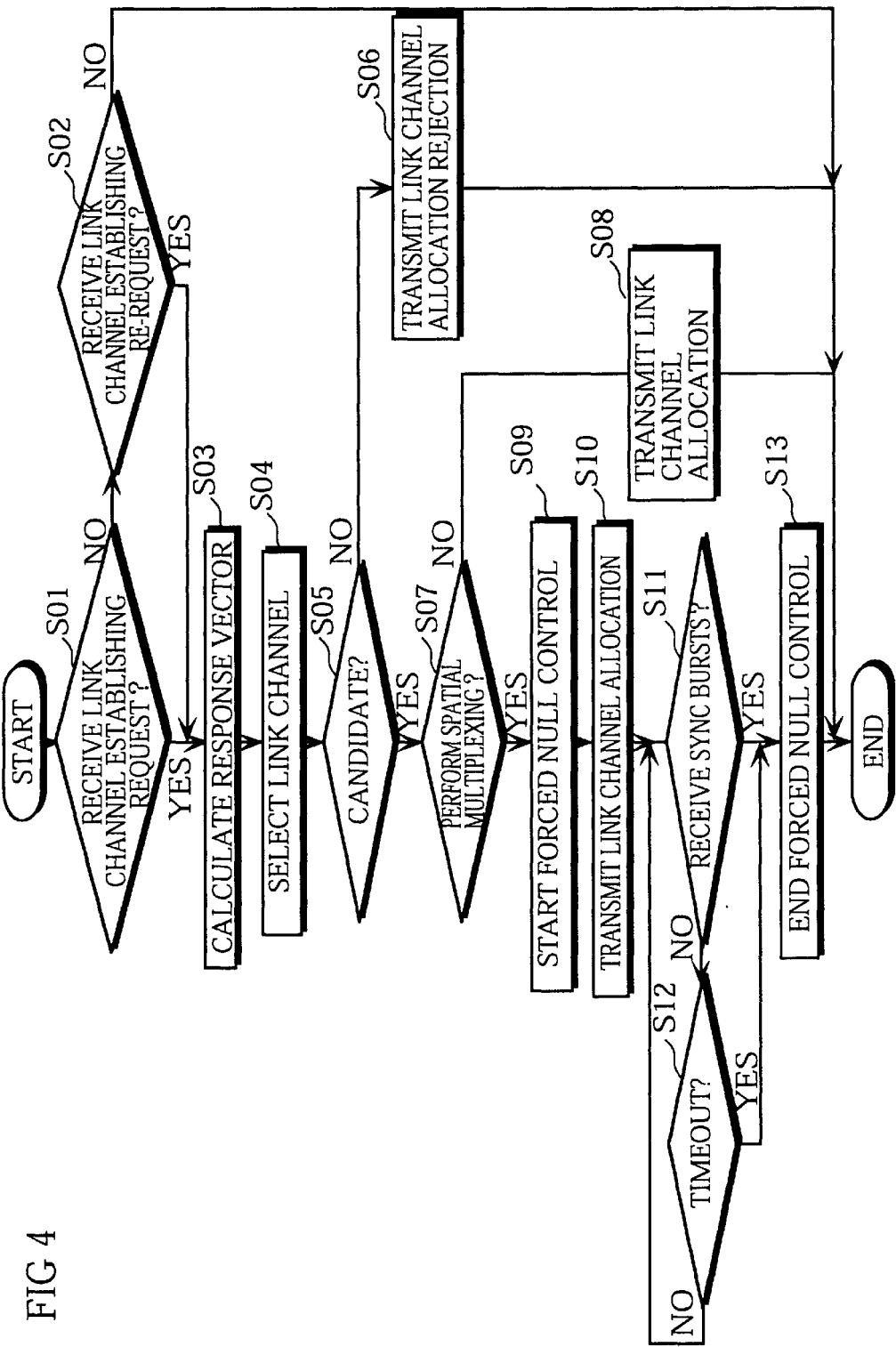
FIG. 4 is a flowchart showing processing performed by a control unit.

FIG. 3 is a block diagram showing a structure of the user processing unit 51*a*. The user processing unit 51*a* includes multipliers 521 to 524, multipliers 581 to 584, an adder 59, a transmission/reception switch 56, a reference signal generation unit 55, a weight calculation unit 58, and a weight selection unit 57.

The reference signal generation unit 55 generates a reference signal for a predetermined section of the received content, for example the UW (unit word) field.

The weight calculation unit 58 calculates weight vectors in each timeslot so that a sum of errors between each received signal and the reference signal can be kept to a minimum.

The multipliers 521 to 524 and the adder 59 adjust the amplitude and phase of signals input from each of the wireless units 11, 21, 31, and 41 according to weight vectors calculated by the weight calculation unit 58, and add the adjusted signals.

The weight selection unit 57 selects, in each timeslot, either weight vectors calculated by the weight calculation unit 68 or forced null weight vectors calculated by the forced null weight calculation unit 52, according to instructions from the control unit 80.

The multipliers 581 to 584 adjust the amplitude and phase of signals output to each of the wireless, units 11, 21, 31, and 41, according to the weight vectors or forced null vectors that have been selected by the weight selection unit 57.

Detailed Description of Response Vector Calculation Unit

The response vector calculation unit 53 calculates response vectors using the following method.

Suppose that spatially-multiplexed signals received from the mobile stations a to d by the wireless units 11, 21, 31, and 41 are signals $X_1$, $X_2$, $X_3$, and $X_4$, and reference signals for the mobile stations a to d are signals $A_a$, $A_b$, $A_c$, and $A_d$. When $$X_1 = h_{1a}A_a + h_{1b}A_b + h_{1c}A_c + h_{1d}A_d$$

$$X_2 = h_{2a}A_a + h_{2b}A_b + h_{2c}A_c + h_{2d}A_d$$

$$X_3 = h_{3a}A_a + h_{3b}A_b + h_{3c}A_c + h_{3d}A_d$$

$$X_4 = h_{4a}A_a + h_{4b}A_b + h_{4c}A_c + h_{4d}A_d,$$

then $R_a = (h_{1a}, h_{2a}, h_{3a}, h_{4a})^T$ is the response vector of the mobile station. a, T being an inverse.

Logically, computing the correlation between the signal $X_1$ received by the wireless unit 11 and the reference signal $A_a$ for the mobile station a should enable terms relating to signals from other mobile stations to be excluded and an adjustment value $h_{1a}$ to be calculated. However, since reference signal $A_a$ cannot be confirmed for the entire length of the signal at the mobile station, a signal $U_a$, that is the signal from the mobile station a after it has been separated by the signal adjusting unit 51, is used instead to calculate the adjustment value $h_{1a}$ asymptotically. Adjustment values $h_{2a}$, $h_{3a}$, and $h_{4a}$ are calculated by computing the correlation between signals received by each,of the wireless units 21, 31, and 41 and the separated signal $U_a$ from the mobile station a.

The response vectors $R_b$, $R_c$, and $R_d$ for the mobile stations b, c, and d are calculated in the same way.

Detailed Description of Forced Null Weight Calculation Unit

The forced null weight calculation unit 52 calculates forced null weight vectors as follows.

If separated signals received from each of the mobile stations a to d, the signal adjusting unit 51 are $U_a$, $U_b$, $U_c$, and $U_d$, the forced null weight vectors are as follows:

$$F_a = (f_{1a}, f_{2a}, f_{3a}, f_{4a})^T$$

$$F_b = (f_{1b}, f_{2b}, f_{3b}, f_{4b})^T$$

$$F_c = (f_{1c}, f_{2c}, f_{3c}, f_{4c})^T$$

$$F_d = (f_{1d}, f_{2d}, f_{3d}, f_{4d})^T.$$

Here T is an inverse.

The calculation performed by the signal adjusting unit 51 to separate the signals $U_a$, $U_b$, $U_c$, and $U_d$, belonging to the mobile stations a to d respectively, from the signals $X_1$, $X_2$, $X_3$, and $X_4$ received by the wireless units 11, 21, 31, and 41 is shown by the following formulas.

$$U_a = f_{1a}X_1 + f_{2a}X_2 + f_{3a}X_3 + f_{4a}X_4$$

$$U_b = f_{1b}X_1 + f_{2b}X_2 + f_{3b}X_3 + f_{4b}X_4$$

$$U_c = f_{1c}X_1 + f_{2c}X_2 + f_{3c}X_3 + f_{4c}X_4$$

$$U_d = f_{1d}X_1 + f_{2d}X_2 + f_{3d}X_3 + f_{4d}X_4$$

If the separated signal $U_a$ from the mobile station a is expanded using the formula for defining the response vectors, then $$U_a = f_{1a}(h_{1a}A_a + h_{1b}A_b + h_{1c}A_c + h_{1d}A_d)$$

$$+ f_{2a}(h_{2a}A_a + h_{2b}A_b + h_{2c}A_c + h_{2d}A_d)$$

$$+ f_{3a}(h_{3a}A_a + h_{3b}A_b + h_{3c}A_c + h_{3d}A_d)$$

$$+ f_{4a}(h_{4a}A_a + h_{4b}A_b + h_{4c}A_c + h_{4d}A_d)$$

$$= (f_{1a}h_{1a} + f_{2a}h_{2a} + f_{3a}h_{3a} + f_{4a}h_{4a})A_a$$

$$+ (f_{1a}h_{1b} + f_{2a}h_{2b} + f_{3a}h_{3b} + f_{4a}h_{4b})A_b$$

$$+ (f_{1a}h_{1c} + f_{2a}h_{2c} + f_{3a}h_{3c} + f_{4a}h_{4c})A_c$$

$$+ (f_{1a}h_{1d} + f_{2a}h_{2d} + f_{3a}h_{3d} + f_{4a}h_{4d})A_d.$$

A set of conditions for a forced null vector used to calculate the reference signal $A_a$ for the mobile station a as the signal $U_a$, are calculated as follows using the response vectors.

$$f_{1a}h_{1a} + f_{2a}h_{2a} + f_{3a}h_{3a} + f_{4a}h_{4a} = 1$$

$$f_{1a}h_{1b} + f_{2a}h_{2b} + f_{3a}h_{3b} + f_{4a}h_{4b} = 0$$

$$f_{1a}h_{1c} + f_{2a}h_{2c} + f_{3a}h_{3c} + f_{4a}h_{4c} = 0$$

$$f_{1a}h_{1d} + f_{2a}h_{2d} + f_{3a}h_{3d} + f_{4a}h_{4d} = 0$$

If $f_{1a}$, $f_{2a}$, $f_{3a}$, and $f_{4a}$ satisfying this set of conditions are calculated, $f_{1a}$, $f_{2a}$, $f_{3a}$, and $f_{4a}$ will be a forced null vector which directs a beam toward the mobile station a, and nulls out mobile stations b, c, and d. The forced null vector may also be calculated by modifying the weight vector to satisfy the above conditions immediately prior to the shift to forced null control. Note that the above method for calculating a forced null vector is just one example of a possible method, and the invention is not characterized by any particular method for calculating the forced null vector.

The same calculation is performed for the mobile stations b, c, and d, with forced null vectors being calculated based on response vectors.

Detailed Description of the Control Unit

The following describes control operations performed by control unit 80 in the present embodiment.

The control unit 80, upon receiving a link channel establishing request or a link channel establishing re-request (step S01, step S02), calculates a response vector for the mobile station requesting channel allocation, based on the received signal (step S03). Then the control unit 80 searches for a channel that is available for allocation (step S04). If there is no suitable channel (step S05), the control unit 80 transmits a link channel allocation rejection (step S06). If the channel to be allocated is not spatially-multiplexed, in other words if it is the only channel in a particular timeslot (step S07), the control unit 80 transmits a link channel allocation (step S08). If the channel to be allocated is spatially-multiplexed, the control unit 80 starts forced nulling and transmission power reduction control for other spatially-multiplexed mobile stations (step S09), and transmits a link channel allocation (step S10).

Once forced nulling and transmission power reduction control have started, when a sync burst signal is received from the mobile station that has been allocated the link channel (step S11) or when a certain time expires without a sync burst signal being received (step S12), the control unit 80 performs normal directional pattern forming control for the other spatially-multiplexed mobile stations and returns their transmission power to normal (step S11).

The wireless base station in the above embodiment is employed in the PHS, but the present invention may be used in any other communications system that employs spatial multiplexing, provided that such a system judges whether a channel can be used by measuring noise level when a mobile station receives a link channel allocation.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A wireless base station using an adaptive array method to form wireless connections with a plurality of mobile stations using spatial multiplexing, the wireless base station comprising:

determining means for determining a direction in which a specified mobile station that is to be spatially-multiplexed is located;

first calculating means for calculating a first parameter group, used to form a first directional pattern for each already connected mobile station that should be spatially-multiplexed with the specified mobile station, the first directional pattern being such that a null point is formed in the determined direction; and controlling means for performing control, after a link channel allocation has been transmitted to the specified mobile station, so that transmission is performed to each already connected mobile station by forming the corresponding first directional pattern and further by reducing transmission power uniformly in all directions.

2. The wireless base station of claim 1, further comprising:

second calculating means for calculating a second parameter group used to form a second directional pattern that optimizes signals to and from each already connected mobile station, wherein the control means performs control to perform transmission for each already connected mobile station by (1) forming the corresponding second directional pattern and (2) returning transmission power to a normal level, the control being performed when:

a sync burst signal is received from the specified mobile station; or a specified time expires without a sync burst signal being received from the specified mobile station.

3. The wireless base station of claim 1, further comprising:

detecting means for detecting a signal level of each already connected mobile station, wherein the control means reduces the transmission power to each already connected mobile station, based on a corresponding detected signal level.

4. The wireless base station of claim 2, further comprising:

detecting means for detecting a signal level of each already connected mobile station, wherein the control means reduces the transmission power to each already connected mobile station, based on a corresponding detected signal level.

5. A control method used by a wireless base station that uses an adaptive array method to form wireless connections with a plurality of mobile stations using spatial multiplexing, the control method comprising:

a determining step of determining a direction in which a specified mobile station that is to be spatially-multiplexed is located;

a first calculating step of calculating a first parameter group, used to form a first directional pattern for each already connected mobile station that should be spatially-multiplexed with the specified mobile station, the first directional pattern being such that a null point is formed in the determined direction; and a controlling step of performing control, after a link channel allocation has been transmitted to the specified mobile station, so that transmission is performed to each already connected mobile station by forming the corresponding first directional pattern and further by reducing transmission power uniformly in all directions.

* * * * *